United States Patent [19]

Ludena

[11] Patent Number: 5,235,904
[45] Date of Patent: Aug. 17, 1993

[54] MULTI-FLEX COOKER

[76] Inventor: Octavio R. Ludena, 120 V. Luna Extension, Sikatuna Village, Quezon City, Philippines

[21] Appl. No.: 988,691

[22] Filed: Dec. 10, 1992

[51] Int. Cl.$^5$ .......................... A47J 27/04; F24D 1/00
[52] U.S. Cl. ........................................ 99/413; 99/417; 99/450; 125/369; 125/377
[58] Field of Search ................. 99/403, 410, 413–417, 99/450; 126/369, 377, 388; 220/408, 428, 912

[56] References Cited

U.S. PATENT DOCUMENTS

| | | | |
|---|---|---|---|
| 78,588 | 6/1868 | Gale et al. | 126/369 |
| 1,383,971 | 7/1921 | Biette | 126/377 |
| 1,651,442 | 12/1927 | Caskin | 126/369 |
| 2,025,333 | 12/1935 | Richheimer | 126/377 |
| 3,641,926 | 2/1972 | Williams et al. | 99/417 |
| 3,808,963 | 5/1974 | Ludena | 99/417 |
| 4,238,996 | 12/1980 | Okuyama | 99/403 |
| 4,574,776 | 3/1986 | Hidle | 99/413 |
| 4,604,989 | 8/1986 | Kita | 99/413 |
| 4,739,698 | 4/1988 | Allaire | 99/410 |
| 5,069,198 | 12/1991 | Henderson | 126/369 |

FOREIGN PATENT DOCUMENTS 330764  6/1958  Switzerland .................. 126/369

*Primary Examiner*—Timothy F. Simone

[57] ABSTRACT

This invention is a cooking device which consists of cylindrical main vessel with a flared open top with annular shoulders on which is seated the perforated annular shoulder of a smaller cooker vessel that extends downwardly in the main vessel, a tray-like vessel having a perforated annular shoulder seated on the inwardly extending annular rim of the smaller cooker vessel, a central upwardly extending wall defining an annular circular opening on the tray-like vessel, a combined cover and receptacle seated on the annular shoulder of the main vessel and having a perforated concave top spacedly above the tray-like vessel, and a cover on top of the perforated concave top.

1 Claim, 1 Drawing Sheet

MULTI-FLEX COOKER

This invention relates to cooking devices or utensils in general, and more particularly to a multi-flex cooker. One of the objects of this invention is to provide a cooking device which could be used in cooking or preparing at least four (4) different kinds of food items.

Another object is to provide a multi-flex cooker which is very efficient as it maximizes the utilization of the super heated steam generated within said cooker thereby resulting in considerable energy savings.

An object, also, of this invention is to provide a cooking device for preparing at least four (4) different food items at the same time and at much lesser time.

These objects and others will be easily comprehended after reading the following detailed description of the appended drawing which form part of this specification

DESCRIPTION OF THE PREFERRED EMBODIMENT

Figure 1:
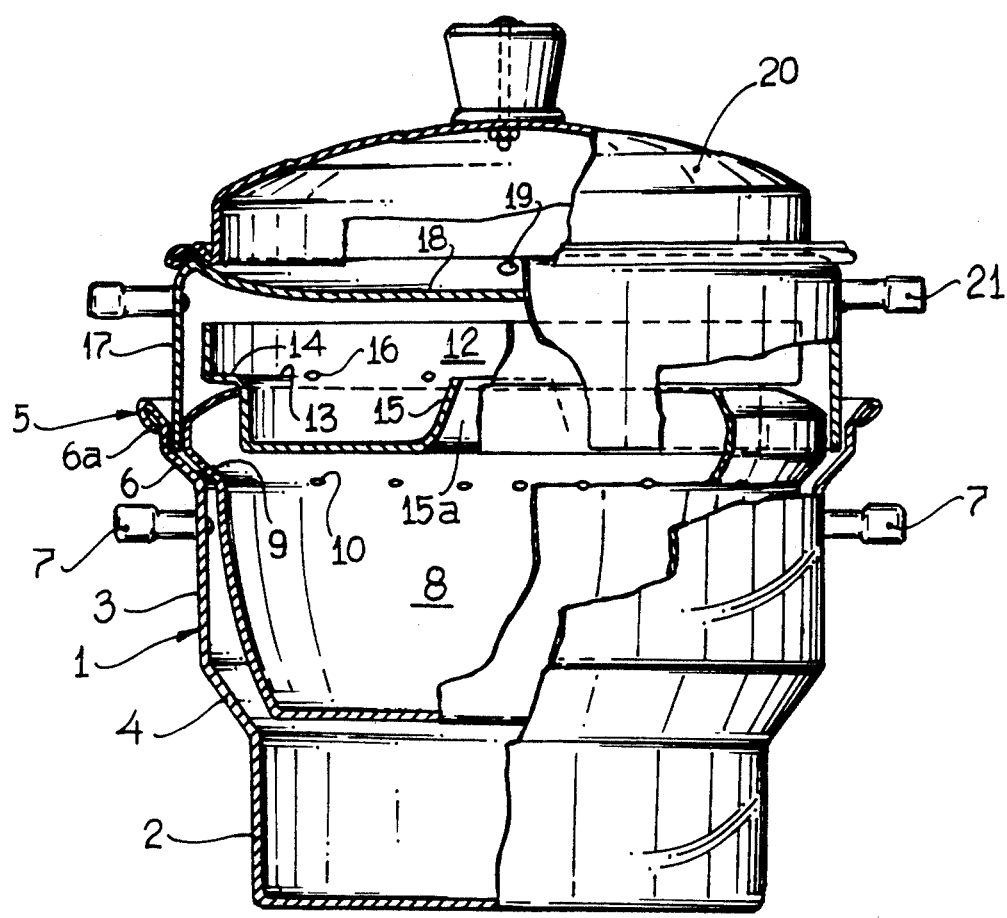
FIG. 1, the lone figure of the drawing, is a side elevational view of the multi-flex cooker with portions thereof cut away to show the various parts thereof.

As with conventional cooking devices, this invention is cylindrical in shape. This invention of a multi-flex cooker has a main vessel 1 which has a reduced portion 2, an enlarged upper portion 3 and an intermediate annular slanting portion 4. The top of the enlarged portion is flared to define a lower annular shoulder 6 and an upper annular shoulder 6a. Below the shoulders are disposed, in diametrically opposed manner, the handles 7.

Disposed loosely within the main vessel 1 is the lower cooking vessel 8 which has a flared annular top portion to define an annular shoulder 9 with spaced apart holes 10 at the lower side of said shoulder. Upwardly of the flared annular top is an inwardly extending annular rim 11.

Seated on the inwardly slanting annular rim is the upper cooker 12 which is tray-like. This tray-like upper cooker has an enlarged upper portion 13 which define with the reduced lower portion an annular shoulder 14 which is engageable with the rim 11. Centrally of the upper cooker is an annular upwardly extending circular wall 15 which define a central opening through which steam enters into the tray-like upper cooker 12. Several spaced apart holes 16 are provided at the inner circumference of the shoulder 14, also for the passage of steam.

Loosely covering the tray-like upper cooker is the combined cover and receptacle 17 which has a concave top 18 with several spaced apart holes 19 on the circumferential edge thereof. The said circumferential edge or rim is tapered to allow the seating of the cover 20. Said tray-like cooker has a pair of diametrically opposed handles 21, while said cover has a centrally located handle.

To use this multi-flex cooker, the lower portion of the main vessel is filled with water substantially below the bottom of the lower cooking vessel wherein is placed rice with water. Different kinds of vegetables and even meat or fish are placed in the tray-like upper cooker. In the concave of the combined cover receptacle are placed materials which are to be warmed.

Due to the placement or location of the various steam openings, super heated steam is generated resulting in fast and economical cooking.

I claim:

1. A multi-flex cooker having a cylindrical main vessel with a reduced bottom portion, said main vessel having a pair of diametrically opposed handles, a lower cooking vessel disposed within said main vessel and extending substantially therein, said lower cooking vessel having a flared top portion with an annular shoulder with spaced apart holes and an inwardly extending annular rim upwardly of said flared portion, a tray-like upper cooker having several spaced apart holes on the shoulder thereof and a central opening defined by an upwardly extending circular wall, a combined cover and receptacle having a concave top wall and also a pair of diametrically opposed handles, and a top cover seated on the tapered rim of said combined cover and receptacle, said top cover being provided with a central disposed handle.

* * * * *